INVENTOR
JAMES L. RUSSELL

Feb. 10, 1970   J. L. RUSSELL   3,495,243
MEANS FOR GENERATING A SIGNAL AT A PREDETERMINED TIME
TO CLOSEST APPROACH BETWEEN TWO OBJECTS
Filed April 22, 1968   2 Sheets-Sheet 2

INVENTOR
*JAMES L. RUSSELL*

3,495,243
MEANS FOR GENERATING A SIGNAL AT A PREDETERMINED TIME TO CLOSEST APPROACH BETWEEN TWO OBJECTS
James L. Russell, York, Pa., assignor to The Bendix Corporation, a corporation of Delaware
Filed Apr. 22, 1968, Ser. No. 722,910
Int. Cl. G01s 9/23
U.S. Cl. 343—14         10 Claims

ABSTRACT OF THE DISCLOSURE

A means using techniques based on reflected energy to provide an output indication whenever the time to closest approach of a transceiver with a target moving relative to the transceiver is equal to a preset value. A transceiver is modulated to generate a transmitted signal whose frequency rises linearly with time. The transmitted signal frequency after reflection from the target and receipt at the transceiver differs from the instantaneous transceiver frequency by the transceiver frequency shift during the round trip signal propagation time and the Doppler shift due to the relative velocity of the target with respect to the transceiver. The received signal frequency is mixed with the instantaneous transceiver frequency, the mixer output being filtered to pass only the difference frequency. For predetermined values of nominal transceiver frequency and rate of change of frequency the time to closest approach indication occurs when the difference frequency becomes zero.

BACKGROUND OF THE INVENTION

The determination or measurement of a time to closest approach between two objects moving relative to one another where one of the objects is an intruder and the other object is an interrogator seeking to determine this time to closest approach is generally accomplished by independently measuring the range and range rate therebetween and computing the ratio thereof, the computation providing the determination of the time to closest approach at the time of measurement. Range is determined by the round trip propagation time of a signal transmitted from the interrogator and reflected from the intruder back to the interrogator while range rate is best determined by the doppler shift of the reflected signal upon receipt by the interrogator.

If only time to closest approach is to be determined a system which requires that both range and range rate be measured independently is inefficient in that the passband required to accept the range of doppler frequencies associated with the anticipated range of approach velocities is quite broad. Additionally, transmitter power required in any given application must be increased to overcome self-noise and interference in the bandpass.

SUMMARY OF THE INVENTION

This invention utilizes radar, sonar, optical systems or other techniques based on reflected energy, to provide an output indication, T, whenever the time to closest approach of an object equipped with the invention with another object, which is not necessarily equipped with the invention, is equal to a predetermined value. The invention differs from the prior art in that the ratio of range to range rate is measured without independently measuring range or range rate. This invention further teaches how the measurement of the ratio of range to range rate can be simplified by generating a transmitted signal which is so modulated that when reflected signals are combined with a portion of the signal being transmitted, difference frequencies will be generated which, for the desired time to closest approach, lie in a narrow band about zero frequency. This frequency band is the same whether the intruder object is nearby and approaching slowly or at an extended range and approaching at a proportionately higher velocity. The output bandwidth of the filter required to sense the fact that the difference frequencies are approaching zero frequency is small compared to the passband required by systems which must measure range rate independently. Consequently, the invention not only provides greater simplicity of equipment but also requires less thansmitter power in any given application to overcome self-noise and interference in the output passband.

A transceiver incorporating the principles of this invention is located on an interrogating object. An intruder is assumed to be approaching the interrogator at a relative velocity (range rate) of $\dot{R}$. The interrogator transmits a signal at a nominal frequency, $ft$, which is modulated to increase linearly with time at a rate $\dot{f}t$. Signals reflected from the intruder at a distance $R$ will be delayed by a time equal to $2R/c$, where $c$ is equal to the signal propagation velocity, so that the frequency, $fr$, of the reflected signals (neglecting Doppler effect) received at the transceiver will be at a lower frequency than $ft$, the instantaneous transceiver frequency, at the time of arrival of the signals by an amount $2R\dot{f}t/c$.

Neglecting now the frequency shift due to the modulation of the transmitted frequency, the shift in the received signal frequency due to the relative motion between the interrogator and the intruder (Doppler shift) is equal to $2\dot{R}ft/c$. The total frequency shift, $fd$, is equal to the summation of these two effects and may be expressed by:

$$fd = 2\dot{R}ft/c - 2R\dot{f}t/c \qquad (1)$$

$fd$ is the frequency which will be passed by a low-pass filter following a mixer circuit in which received signals and a portion of the transmitter output signal are heterodyned. If the filter is designed to pass only those frequencies near zero, it can be seen that a filter output will occur only when:

$$R/\dot{R} = ft/\dot{f}t \qquad (2)$$

within limits determined by the filter bandpass. Since the ratio $R/\dot{R}$ is the predicted time to closest approach. Equation 2 indicates that for each value of time to impact a unique value of $ft/\dot{f}t$ is required to produce a receiver output. Conversely, for a given ratio of $ft/\dot{f}t$, a unique time to closest approach will be required to produce an output. This relationship is the foundation upon which this invention is based.

It will be apparent to one skilled in the applicable art that it is impractical to permit the transmitted frequency to rise continuously at the rate $\dot{f}t$. Continuous increase is not necessary however, it only being required that the period of such increase be long compared to the propagation of $2R/c$. The transmitted frequency is thus modulated with a linear sawtooth frequency to produce an output transmitted signal whose frequency vs. time slope is the desired value of $\dot{f}t$ during the period of each sawtooth. The sawtooth period is made long compared to the round trip propagation time to the farthest target of interest.

DESCRIPTION OF THE PREFERRED EMBODIMENT

In describing the preferred embodiment reference will be made to a radar system. However, it should be understood that the teachings of the invention to be described apply equally to sonar, optical and other systems which make use of reflected energy.

Figure 1:
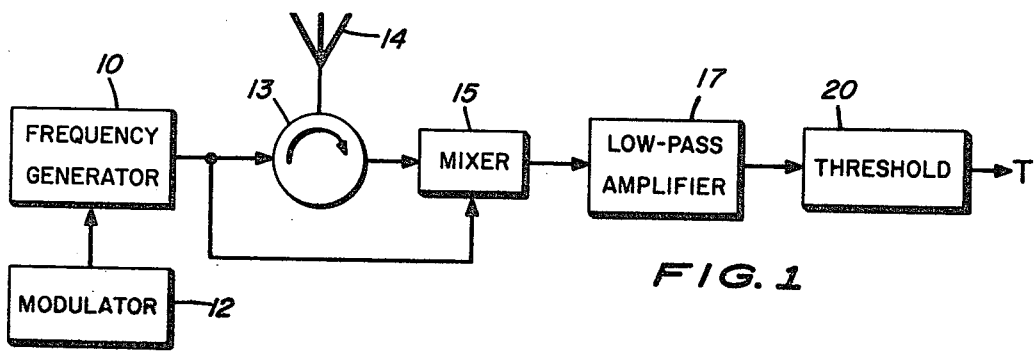
FIG. 1 is a block diagram of a basic system employing the principles of this invention.

Referring to FIG. 1, a frequency generator 10, suitably generating a signal frequency in the radar spectrum, is frequency modulated by a sawtooth waveform generated by modulator 12, the sawtooth waveform having a period which is long compared to the round trip propagation time of radar energy to targets whose time to closest approach is to be determined. The modulated radar signal is applied through circulator 13 to antenna 14 from whence it is radiated into space. Reflected signals returned to antenna 14 are applied to mixer 15 through circulator 13 where they are mixed with a portion of the transmitted radar signal frequency. The mixed frequency products are applied to a low-pass amplifier 17 which has an upper cut-off frequency which is just below the frequency (repetition rate) of the sawtooth waveform generated by modulator 12. It might at first be thought that to suppress amplitude modulation resulting from the frequency modulation process, the ratio of amplifier upper frequency limit to modulating frequency should be as large as possible. Unfortunately, however, as this ratio is increased, nulls which are produced in the difference frequency output spectrum of the mixer can cause false triggering of threshold 20 which is normally triggered when the mixer difference frequency output approaches zero. For this reason, the low-pass amplifier cut-off frequency is kept near the modulating frequency and AM effects are suppressed with notch filters. The upper frequency limit, B, of the low-pass amplifier is thus limited by the relationship $$fm > B > fm/2$$

where $fm$ is the modulating frequency fundamental. Amplifier bandpass is also limited by the rate of change of the mixer difference frequency produced by the highest anticipated approach velocity. This relationship is $$B \geq (\dot{f}d/2)^{1/2}$$

where $fd$ is the mixer output difference frequency and $\dot{f}d = \dot{f}R$ for the highest anticipated approach velocity.

When the mixer 15 output difference frequency approaches zero, indicating the time of closest approach as explained earlier, mixer output passes through low-pass amplifier 17 and triggers threshold 20 to generate an output indicating that the desired time to closest approach has arrived.

Figure 5:
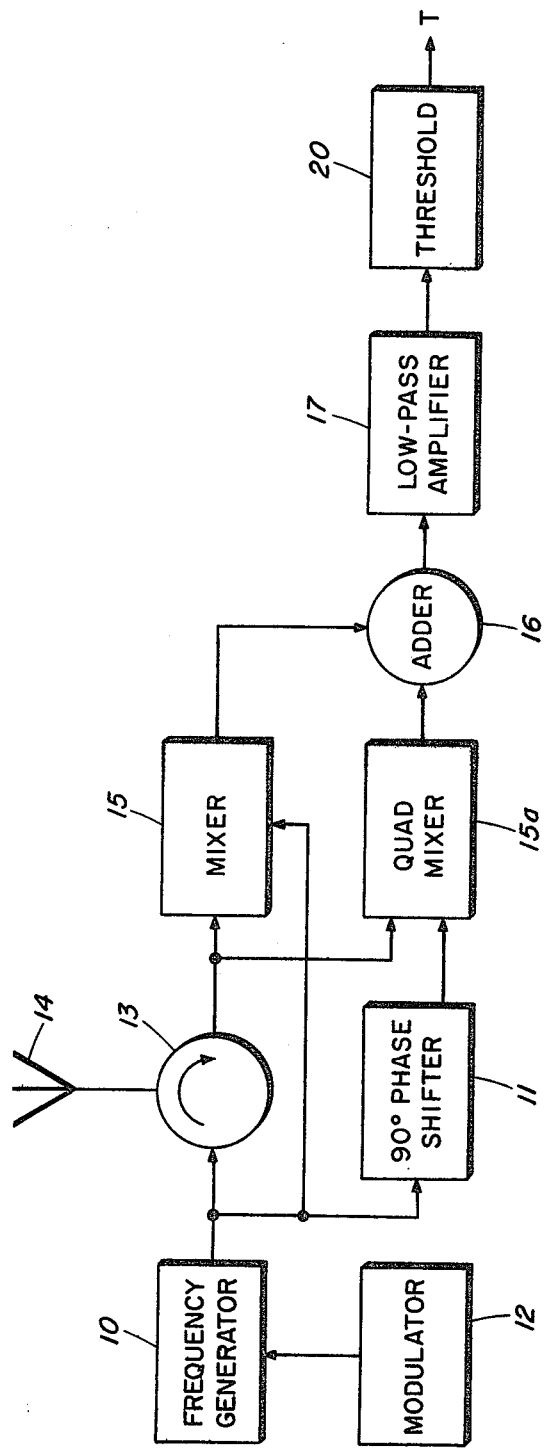
FIG. 5 is a block diagram showing the invention with quadrature mixing means.

Under certain conditions of range and range rate, the resultant Doppler shift will be equal to a whole number of harmonics of $fm$ plus approximately half a harmonic so that the instantaneous frequency at the desired time to closest approach lies approximately midway between two such harmonics. Consequently, energy at $+B$ and $-B$ in approximately equal amplitudes is passed by low-pass amplifier 17. This illustrates that "zero" frequency associated with the desired time to closest approach may in fact lie anywhere between zero and $fm/2$ depending on the range rate and associated Doppler frequency shift. If the frequency is low and its phase is $\pi/2$ or odd multiples thereof (assuming a cosine wave) at the desired time to closest approach, a wide null at the desired time to closest approach may reduce mixer output amplitude and materially shift the time for maximum output. The use of quadrature mixing will provide a much sharper null at the desired time to closest approach resulting in improved system performance. The addition of means for quadrature mixing to the basic system of FIG. 1 is illustrated in FIG. 5, reference to which should now be made, and wherein like elements to those shown in FIG. 1 are marked with like reference numerals. As was the case in the operation of the system of FIG. 1, a frequency generator 10, suitably generating a signal frequency in the radar spectrum, is frequency modulated by a sawtooth waveform generated by modulator 12, the sawtooth waveform having a period which is long compared to the round trip propagation time of radar energy to targets whose time to closest approach is to be determined. The modulated radar signal is applied through circulator 13 to antenna 14 from whence it is radiated into space. Reflected signals returned to antenna 14 are applied to mixer 15 through circulator 13 where they are mixed with a portion of the transmitted radar signal frequency. In addition, returned signals are also applied to quadrature mixer 15a, which is essentially identical to mixer 15. Quadrature mixer 15a receives as a local frequency the output frequency from frequency generator 10 as shifted ninety degrees in phase by phase shifter 11. The mixer outputs are then combined in frequency adder 16 and applied in the manner previously described to low-pass amplifier 17. This means for quadrature mixing will provide a much sharper null at the desired time to closest approach resulting in improved system performance.

A further source of variations is not so easily avoided. Each time the sawtooth frequency modulating function drops from its maximum value to its minimum value, the transmitted frequency changes by $\Delta f$. This will cause a change in phase of the reflected signal of $2R\Delta W/c$, where $\Delta W$ is the change in angular frequency corresponding to $\Delta f$. For ranges where this phase shift is $\pi$ or odd multiples thereof, alternate samples of the mixer difference frequency output are out of phase and the integrating effect to the low-pass amplifier averages the resulting two wave trains and produces a zero output. The effect of this phase shift and the amplitude modulation it produces is to introduce an uncertainty in the time to closest approach when system output will be a maximum. In addition, changes in intruder target radar cross section and in the range at which the desired time to closest approach is reached cause the amplitude of maximum system output to vary over a wide range. Thus, a fixed threshold which must be crossed to generate a system output would be crossed only near the maximum for weak targets but well down the amplitude slope for strong targets.

Figure 2:
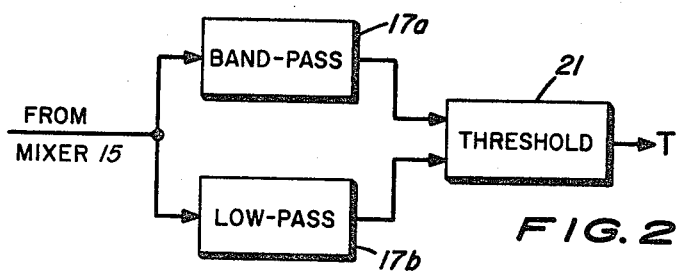
FIG. 2 is a block diagram showing means for avoiding false triggering.

Such variations in time of threshold triggering can be reduced by substituting for the fixed threshold a threshold which, in essence, is inhibited by the presence of high-frequency energy above the pass band of the desired low frequency signals. FIG. 2 shows the basic system of FIG. 1 modified with a threshold 21 which is substituted for threshold 20 of FIG. 1 and is inhibited by signals received from bandpass amplifier 17a which has a bandpass lying above the cut-off frequency of low-pass amplifier 17b, the output of which triggers threshold 21. Amplifiers 17 and 17b are essentially identical. The means for supplying an input to amplifiers 17a and 17b is the same as shown in FIG. 1.

Figure 3:
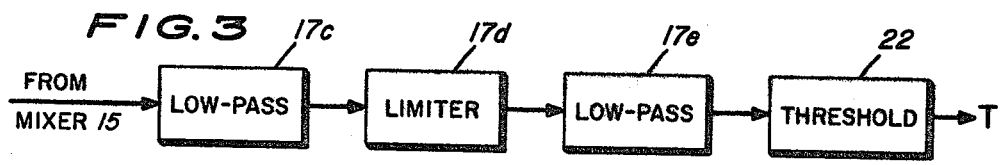
FIG. 3 is a block diagram showing another means for avoiding false triggering.

A modification of the two-amplifier approach of FIG. 2 is seen in FIG. 3 and reference should now be made thereto. A low-pass amplifier 17c having an upper frequency cut-off much higher than $fm$ is placed immediately after the mixer 15 and is followed by a hard limiter 17d and a low-pass amplifier 17e essentially identical to amplifier 17 in FIG. 1. The output of low-pass amplifier 17e will be substantially zero (due to the weak signal suppression by limiter 17d) until the amplitude of signals within the low-pass frequency limits of amplifier 17e approaches that of the energy outside those limits. Maximum output of amplifier 17e will occur when the ratio of energy within the bandpass of that amplifier to total energy is a maximum, and will be independent of signal strength so long as the input to the limiter is well above the limiting level. Threshold 22, which is essentially identical to threshold 20 of FIG. 1, is triggered by the output of low-pass amplifier 17e.

Figure 4:
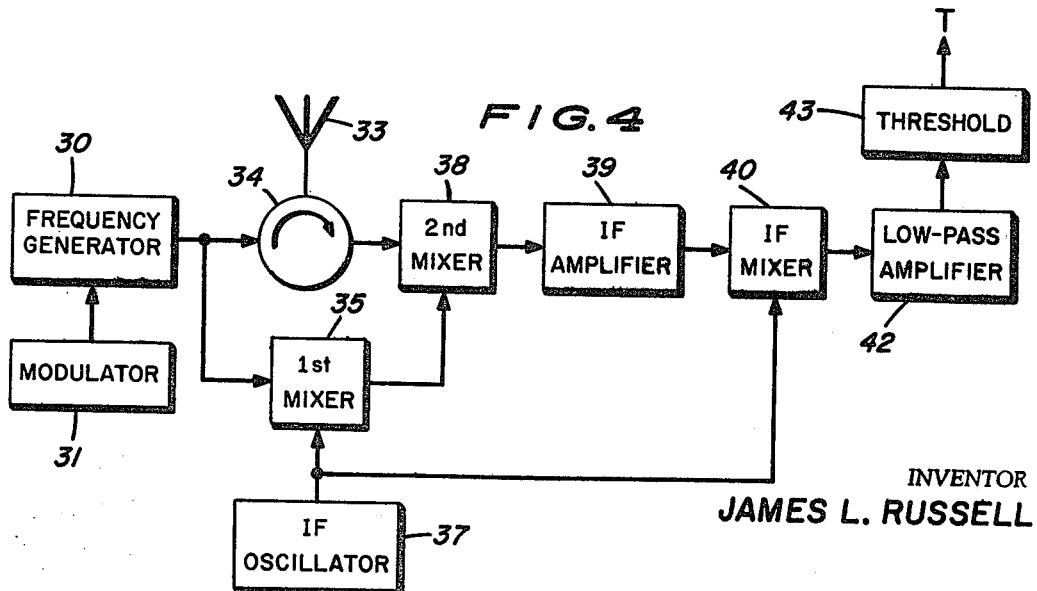
FIG. 4 is a block diagram of a basic system employing the principles of this invention but modified to operate primarily in an intermediate frequency range.

FIG. 4 shows a system utilizing the teachings of this invention and modified to avoid the necessity of working in the low frequency region so as to avoid the characteristic $1/f$ noise associated with the low frequency region. Radar frequencies which are generated by generator 30 and modulated in the manner described by a sawtooth waveform generated by modulator 31 are not only transmitted as before through circulator 34 from antenna 33 but are also mixed in balanced mixer 35 with the output of IF oscillator 37 at an intermediate frequency. The output from mixer 35 consists of two sidebands on either side of $f$, the output frequency of generator 30, and removed therefrom by the intermediate frequency $fi$, with the center frequency suppressed as much as mixer balance can achieve. Signals received on antenna 33 are applied through circulator 34 to second balanced mixer 38 where they are mixed with the output of mixer 35 to generate two output signals: one above the intermediate frequency by the difference frequency $fd$; and, one below the intermediate frequency by the same amount. The two signals are amplified in IF amplifier 39 and beat against $fi$ in IF mixer 40 to produce a mixer output at $fd$ which is the sum of outputs due to the two IF signals. Mixer output is applied to low-pass amplifier 42 which triggers threshold 43 when $fd$ approaches zero in the manner previously described.

The invention claimed is:

1. A system for generating a signal at a predetermined time to closest approach between an interrogator including said system and an intruder comprising:
   a frequency generator for generating a signal frequency;
   means for modulating said signal frequency to increase linearly with time;
   antenna means for transmitting said modulated signal from said interrogator to said intruder and for receiving signals reflected from said intruder;
   a first mixer for combining said received reflected signals with said modulated signal and generating the mixed frequency products thereof;
   a low-pass amplifier responsive to said frequency products for generating an output whose magnitude increases as the difference frequency of said mixed frequency products approaches zero; and
   a threshold for generating said signal at said predetermined time to closest approach when said low pass amplifier output exceeds a predetermined magnitude.

2. A system for generating a signal at a predetermined time to closest approach as recited in claim 1 wherein said modulating means comprises a sawtooth waveform generator having a pulse repetition rate for modulating said signal frequency to increase linearly with time from a first frequency at the start of said sawtooth waveform to a second frequency at the completion of said sawtooth waveform, the period of said sawtooth waveform being much longer than said round trip propagation time of said transmitted signal.

3. A system for generating a signal at a predetermined time to closest approach as recited in claim 1 wherein said modulating means comprises a sawtooth waveform generator having a pulse repetition rate for modulating said signal frequency to increase linearly with time from a first frequency at the start of said sawtooth waveform to a second frequency at the completion of said sawtooth waveform, the period of said sawtooth waveform being much longer than said round trip propagation time of said transmitted signal and the upper cut-off frequency of of said low-pass amplifier being between the inverse of said period of said sawtooth waveform and one-half the inverse of said period of said sawtooth waveform.

4. A system for generating a signal at a predetermined time to closest approach as recited in claim 3 with additionally a bandpass amplifier responsive to said mixed frequency products and having a lower frequency cut-off approximating the upper frequency cut-off of said low-pass amplifier for inhibiting said threshold, said threshold being adapted to be inhibited when the energy density passed by said bandpass amplifier exceeds the energy density passed by said low-pass amplifier, said threshold being also adapted to be triggered when the energy density passed by said low pass amplifier exceeds the energy density passed by said bandpass amplifier by a predetermined amount.

5. A system for generating a signal at a predetermined time to closest approach as recited in claim 1 wherein said modulating means comprises:
   a sawtooth waveform generator having a pulse repetition rate for modulating said signal frequency to increase linearly with time from a first frequency at the start of said sawtooth waveform to a second frequency at the completion of said sawtooth waveform, the period of said sawtooth waveform being much longer than said round trip propagation time of said transmitted signal; and, wherein said low-pass amplifier comprises:
   a first low-pass amplifier having an upper cut-off frequency limit much higher than the inverse period of said sawtooth waveform and responsive to said mixed frequency products for passing any of said mixed frequency products within its passband;
   a limiter for hard limiting said passed mixed frequency products; and,
   a second low-pass amplifier having an upper cut-off frequency limit between the inverse period of said sawtooth waveform and one-half the inverse period of said sawtooth waveform for generating an output signal whose magnitude increases as the difference frequency of said mixed frequency products approaches zero.

6. A system for generating a signal at a predetermined time to closest approach as recited in claim 1 with additionally:
   means for shifting the phase of said modulated signal by 90 degrees;
   a second mixer for combining said received reflected signals with said modulated and phase shifted signals and generating the mixed frequency products thereof; and,
   means for combining said mixed frequency products from said first mixer with said mixed frequency products from said second mixer, said means for generating said signal at said predetermined time to closest approach being responsive to said combined mixed frequency products.

7. A system for generating a signal at a predetermined time to closest approach as recited in claim 1 wherein said first mixer comprises:
   means for generating an intermediate frequency signal;
   a first balanced mixer for combining said intermediate frequency signal with said modulated signal to generate a first double sideband suppressed carrier signal;
   a second balanced mixer for combining said first double sideband suppressed carrier signal with said received reflected signals to generate a second double sideband suppressed carrier signal; and,
   an IF mixer for combining said second double sideband suppressed carrier signal with said intermediate frequency signal to generate said mixed frequency products.

8. A system for generating a signal at a predetermined time to closest approach as recited in claim 7 wherein said modulating means comprises a sawtooth waveform generator having a pulse repetition rate for modulating said signal frequency to increase linearly with time from a first frequency at the start of said sawtooth waveform to a second frequency at the completion of said sawtooth waveform, the period of said waveform being much longer than said round trip propagation time of said transmitted signal.

9. A system for generating a signal at a predetermined time to closest approach as recited in claim 8 wherein said means for generating said signal at said time of closest approach comprises:
   a low-pass amplifier responsive to said mixed frequency products and having an upper frequency cut-off limit between the inverse period of said sawtooth waveform and one-half the inverse period of said sawtooth waveform for generating an output whose magnitude increases as the difference frequency of said mixed frequency products approaches zero; and,
   a threshold for generating said signal at said predetermined time to closest approach when said low-pass amplifier output exceeds a predetermined magnitude.

10. A system for generating a signal at a predetermined time to closest approach as recited in claim 9 with additionally a bandpass amplifier responsive to said mixed frequency products and having a lower frequency cut-off approximating the upper frequency cut-off of said low-pass amplifier for inhibiting said threshold, said threshold being adapted to be inhibited when the energy density passed by said bandpass amplifier exceeds the energy density passed by said low-pass amplifier, said threshold being also adapted to be triggered when the energy density passed by said low-pass amplifier exceeds the energy density passed by said bandpass amplifier by a predetermined amount.

References Cited
UNITED STATES PATENTS

| | | | |
|---|---|---|---|
| 2,933,725 | 4/1960 | Wright et al. | 343—14 |
| 3,012,242 | 12/1961 | Machlis et al. | 343—14 |

RODNEY D. BENNETT, JR., Primary Examiner

H. C. WAMSLEY, Assistant Examiner